(12) United States Patent
Wheaton et al.

(10) Patent No.: US 7,264,206 B2
(45) Date of Patent: Sep. 4, 2007

(54) LEADING EDGE FLAP APPARATUSES AND ASSOCIATED METHODS

(75) Inventors: James M. Wheaton, Seattle, WA (US); Stephen R. Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 10/955,686

(22) Filed: Sep. 30, 2004

(65) Prior Publication Data

US 2006/0102803 A1    May 18, 2006

(51) Int. Cl.
B64C 3/50 (2006.01)
(52) U.S. Cl. .............. 244/214; 244/210; 244/215; 244/216
(58) Field of Classification Search ........ 244/210–216, 244/45 R, 201
See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 2,086,085 A | 7/1937 | Lachmann et al. | |
| 2,169,416 A | 8/1939 | Griswold | |
| 2,282,516 A | 5/1942 | Hans et al. | |
| 2,289,704 A | 7/1942 | Grant | |
| 2,319,383 A | 5/1943 | Zap | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,406,475 A | 8/1946 | Rogers | |

(Continued)

FOREIGN PATENT DOCUMENTS

DE          387833          1/1924

(Continued)

OTHER PUBLICATIONS

"Adaptive Aircraft: No Flight of Fancy?" Research into using exotic means of making wings change shpe in-flight looks promising, though still a long way from reality, Business Week Online, Jan. 7, 2003, pp. 1-3.

(Continued)

*Primary Examiner*—J. Woodrow Eldred
(74) *Attorney, Agent, or Firm*—Perkins Coie LLP

(57) ABSTRACT

The present invention is directed generally toward leading edge flap apparatuses and corresponding methods. One aspect of the invention is directed toward an aircraft system having an airfoil, an actuator driver, and a leading edge device with two flow surfaces and six links. In a further aspect of the invention, the flow surfaces of the leading edge device are at least approximately located in the same position when the actuator driver is in two different positions. Another aspect of the invention is directed toward an aircraft system having an airfoil and a leading edge device movable between at least a retracted position and an extended position along a motion path having two segments. The second flow surface can be positioned generally behind and/or generally above the first flow surface when the first and second flow surfaces are located in the first segment of the motion path.

23 Claims, 6 Drawing Sheets

U.S. PATENT DOCUMENTS

| | | |
|---|---|---|
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | James et al. |
| 2,899,152 A | 8/1959 | Weiland et al. |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,191,147 A | 6/1965 | Majendie |
| 3,203,275 A | 8/1965 | Hoover |
| 3,203,647 A | 8/1965 | Alvarez-Calderon |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,826 A | 12/1972 | Studer et al. |
| 3,704,843 A | 12/1972 | Jenny |
| 3,711,039 A | 1/1973 | James |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregir |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,247,843 A | 1/1981 | Miller |
| 4,262,868 A | 4/1981 | Dean |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,325,123 A | 4/1982 | Graham |
| 4,351,502 A | 9/1982 | Statkus |
| 4,353,517 A | 10/1982 | Rudolph |
| 4,360,176 A | 11/1982 | Brown |
| 4,363,098 A | 12/1982 | Buus et al. |
| 4,368,937 A | 1/1983 | Palombo |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,448,375 A * | 5/1984 | Herndon ..................... 244/216 |
| 4,459,084 A | 7/1984 | Clark |
| 4,461,449 A | 7/1984 | Turner |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker |
| 4,542,869 A | 9/1985 | Brine |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A * | 8/1986 | Stephenson ................. 244/216 |
| 4,637,573 A | 1/1987 | Perin |
| 4,650,140 A | 3/1987 | Cole |
| 4,700,911 A | 10/1987 | Zimmer |
| 4,702,441 A | 10/1987 | Wang |
| 4,702,442 A * | 10/1987 | Weiland et al. ............. 244/216 |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |
| 4,784,355 A | 11/1988 | Brine |
| 4,786,013 A | 11/1988 | Pohl |
| 4,789,119 A | 12/1988 | Bellego et al. |
| 4,796,192 A | 1/1989 | Lewis |
| 4,823,836 A | 4/1989 | Bachmann et al. |
| 4,838,503 A | 6/1989 | Williams et al. |
| 4,856,735 A | 8/1989 | Lotz |
| 4,860,007 A | 8/1989 | Konicke |
| 4,867,394 A | 9/1989 | Patterson, Jr. et al. |
| 4,892,274 A | 1/1990 | Pohl et al. |
| 4,899,284 A | 2/1990 | Lewis et al. |
| 4,962,902 A | 10/1990 | Fortes |

| | | | | | | |
|---|---|---|---|---|---|---|
| 5,039,032 | A | 8/1991 | Rudolph | 6,375,126 B1 | 4/2002 | Sakurai |
| 5,046,688 | A | 9/1991 | Woods | 6,382,566 B1 | 5/2002 | Ferrel et al. |
| 5,050,081 | A | 9/1991 | Abbott et al. | 6,389,333 B1 | 5/2002 | Hansman |
| 5,056,741 | A | 10/1991 | Bliesner et al. | 6,439,512 B1 | 8/2002 | Hart |
| 5,074,495 | A | 12/1991 | Raymond | 6,443,394 B1 | 9/2002 | Weisend |
| 5,082,207 | A | 1/1992 | Tulinius | 6,450,457 B1 | 9/2002 | Sharp |
| 5,082,208 | A | 1/1992 | Matich | 6,464,175 B2 | 10/2002 | Yada et al. |
| 5,088,665 | A | 2/1992 | Vijgen | 6,466,141 B1 | 10/2002 | McKay et al. |
| 5,094,411 | A | 3/1992 | Rao | 6,481,667 B1 | 11/2002 | Ho |
| 5,094,412 | A | 3/1992 | Narramore | 6,484,969 B2 | 11/2002 | Sprenger |
| 5,100,082 | A | 3/1992 | Archung | 6,499,577 B2 | 12/2002 | Kitamoto et al. |
| 5,114,100 | A | 5/1992 | Rudolph | 6,536,714 B2 | 3/2003 | Gleine |
| 5,129,597 | A | 7/1992 | Manthey | 6,547,183 B2 | 4/2003 | Farnsworth |
| 5,158,252 | A | 10/1992 | Sakurai | 6,554,229 B1 | 4/2003 | Lam |
| 5,167,383 | A | 12/1992 | Nozaki | 6,561,463 B1 | 5/2003 | Yount et al. |
| 5,203,619 | A | 4/1993 | Welsch | 6,591,169 B2 | 7/2003 | Jones |
| 5,207,400 | A | 5/1993 | Jennings | 6,598,829 B2 | 7/2003 | Kamstra |
| 5,244,269 | A | 9/1993 | Harriehausen | 6,598,834 B2 | 7/2003 | Nettle |
| 5,259,293 | A | 11/1993 | Brunner | 6,601,801 B1 | 8/2003 | Prow |
| 5,282,591 | A | 2/1994 | Walters et al. | 6,622,972 B2 | 9/2003 | Urnes |
| 5,351,914 | A | 10/1994 | Nagao | 6,622,974 B1 | 9/2003 | Dockter et al. |
| 5,388,788 | A | 2/1995 | Rudolph | 6,625,982 B2 | 9/2003 | Van Den Bossche |
| 5,420,582 | A | 5/1995 | Kubbat | 6,644,599 B2 | 11/2003 | Perez |
| 5,441,218 | A | 8/1995 | Mueller | 6,651,930 B1 | 11/2003 | Gautier et al. |
| 5,474,265 | A | 12/1995 | Capbern | 6,729,583 B2 | 5/2004 | Milliere et al. |
| 5,493,497 | A | 2/1996 | Buus | 6,745,113 B2 | 6/2004 | Griffin |
| 5,535,852 | A | 7/1996 | Bishop | 6,755,375 B2 | 6/2004 | Trikha |
| 5,542,684 | A | 8/1996 | Squirrell | 6,796,526 B2 | 9/2004 | Boehringer |
| 5,544,847 | A | 8/1996 | Bliesner | 6,796,534 B2 | 9/2004 | Beyer |
| 5,564,655 | A * | 10/1996 | Garland et al. ............ 244/216 | 6,799,739 B1 | 10/2004 | Jones |
| 5,600,220 | A | 2/1997 | Thoraval | 6,802,475 B2 | 10/2004 | Davies et al. |
| 5,609,020 | A | 3/1997 | Jackson | 6,824,099 B1 | 11/2004 | Jones |
| 5,680,124 | A | 10/1997 | Bedell | 6,843,452 B1 | 1/2005 | Vassberg et al. |
| 5,681,014 | A | 10/1997 | Palmer | 6,860,452 B2 | 3/2005 | Bacon et al. |
| 5,686,907 | A | 11/1997 | Bedell | 6,870,490 B2 | 3/2005 | Sherry et al. |
| 5,715,163 | A | 2/1998 | Bang | 6,978,971 B1 | 12/2005 | Dun |
| 5,735,485 | A | 4/1998 | Ciprian et al. | 6,981,676 B2 | 1/2006 | Milliere |
| 5,740,991 | A | 4/1998 | Gleine et al. | 7,028,948 B2 | 4/2006 | Pitt |
| 5,743,490 | A | 4/1998 | Gillingham | 7,048,228 B2 | 5/2006 | Vassberg et al. |
| 5,746,490 | A | 5/1998 | Domenig | 7,048,234 B2 | 5/2006 | Reeksiek et al. |
| 5,788,190 | A | 8/1998 | Siers | 7,048,235 B2 | 5/2006 | McLean et al. |
| 5,839,698 | A | 11/1998 | Moppert | 7,051,982 B1 | 5/2006 | Johnson |
| 5,875,998 | A | 3/1999 | Gleine et al. | 7,059,563 B2 | 6/2006 | Huynh |
| 5,921,506 | A | 7/1999 | Appa | 2002/0046087 A1 | 4/2002 | Hey |
| 5,927,656 | A | 7/1999 | Hinkleman | 2002/0100842 A1 | 8/2002 | Perez |
| 5,934,615 | A | 8/1999 | Treichler | 2002/0184885 A1 | 12/2002 | Blot-Carretero et al. |
| 5,978,715 | A | 11/1999 | Briffe | 2003/0058134 A1 | 3/2003 | Sherry |
| 5,984,230 | A | 11/1999 | Drazi | 2003/0127569 A1 | 7/2003 | Bacon et al. |
| 6,015,117 | A | 1/2000 | Broadbent | 2003/0132860 A1 | 7/2003 | Feyereisen et al. |
| 6,045,204 | A | 4/2000 | Frazier | 2003/0197097 A1 | 10/2003 | Wakayama |
| 6,057,786 | A | 5/2000 | Briffe | 2004/0004162 A1 | 1/2004 | Beyer |
| 6,073,624 | A | 6/2000 | Laurent | 2004/0016556 A1 | 1/2004 | Barber |
| 6,076,767 | A | 6/2000 | Farley et al. | 2004/0059474 A1 | 3/2004 | Boorman et al. |
| 6,076,776 | A | 6/2000 | Breitbach | 2004/0195464 A1 | 10/2004 | Vassberg et al. |
| 6,079,672 | A | 6/2000 | Lam et al. | 2004/0217575 A1 | 11/2004 | Beaujot et al. |
| 6,082,672 | A | 7/2000 | Audren | 2004/0245386 A1 | 12/2004 | Huynh |
| 6,082,679 | A | 7/2000 | Crouch et al. | 2005/0011994 A1 | 1/2005 | Sakurai et al. |
| 6,085,129 | A | 7/2000 | Schardt | 2005/0017126 A1 | 1/2005 | McLean et al. |
| 6,109,567 | A | 8/2000 | Munoz | 2005/0061922 A1 | 3/2005 | Milliere |
| 6,112,141 | A | 8/2000 | Briffe | 2005/0242234 A1 | 11/2005 | Mahmulyin |
| 6,152,405 | A | 11/2000 | Muller et al. | 2006/0038086 A1 | 2/2006 | Reckzeh |
| 6,161,801 | A | 12/2000 | Kelm | 2006/0226297 A1 * | 10/2006 | Perez-Sanchez ............ 244/216 |
| 6,164,598 | A | 12/2000 | Young et al. | 2006/0245882 A1 | 11/2006 | Khan et al. |
| 6,188,937 | B1 | 2/2001 | Sherry | | | |
| 6,189,837 | B1 | 2/2001 | Matthews | FOREIGN PATENT DOCUMENTS | | |
| 6,213,433 | B1 | 4/2001 | Gruensfelder | | | |
| 6,227,498 | B1 | 5/2001 | Arata | DE | 11 29 379 | 5/1962 |
| 6,244,542 | B1 | 6/2001 | Young et al. | EP | 0100775 A1 | 2/1984 |
| 6,293,497 | B1 | 9/2001 | Kelley-Wickemeyer | EP | 0 103 038 | 3/1984 |
| 6,328,265 | B1 | 12/2001 | Dizdarevic | EP | 0 370 640 | 5/1990 |
| 6,349,798 | B1 | 2/2002 | McKay | EP | 0 483 504 A1 | 5/1992 |
| 6,349,903 | B2 | 2/2002 | Caton et al. | EP | 0 489 521 | 6/1992 |
| 6,364,254 | B1 | 4/2002 | May | EP | 0 781 704 | 7/1997 |

| | | |
|---|---|---|
| EP | 0 947 421 | 10/1999 |
| EP | 1010616 | 6/2000 |
| EP | 1338506 | 8/2003 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58273 | 11/1953 |
| GB | 886136 | 1/1962 |
| GB | 1 181 991 | 2/1970 |
| GB | 2 144 688 A | 3/1985 |
| WO | WO-02/24530 | 3/2002 |

OTHER PUBLICATIONS

"Aero-Space Research & Technology," Space Systems, Sep. 1, 2001, pp. 1-28.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.
"Morphing aircraft Structure,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.
Leaf Spring Retainer Seals; EMP, Inc.; 2 pgs.
Morphing Systems, "Morphing Aerostructures-An Overview," www.crgrp.net/morphingsystems.htm_<http://www.crgrp.net/morphingsystems.htm>, pp. 1-9, [Accessed Aug. 31, 2005].
PCT International Search Report and Written Opinion for PCT/US2005/033304; The Boeing Company; Nov. 17, 2006; 20 pgs; European Patent Office.
U.S. Appl. No. 10/671,435, Kelley-Wickemyer.
U.S. Appl. No. 10/770,256, Speer.
U.S. Appl. No. 10/789,100, Lacy.
U.S. Appl. No. 10/935,846, Good et al.
Drela, M., "Optimization Techniques In Airfoil Design," MIT Aero & Astro, 29 pages.
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16 [Accessed Aug. 7, 2003].
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeornautics and Space Administration, Aug. 1974 (pp. 8-18).
U.S. Appl. No. 09/714,026, Sakurai.
U.S. Appl. No. 10/868,234, Rampton et al.
U.S. Appl. No. 10/868,238, Dun.
U.S. Appl. No. 10/454,417, Neal V. Huynh.
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 60/475,828, Kevin W. Beyer.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Patent Application No. EP 03 07 7840, The Boeing Company, Nov. 4, 2003 (2 pages).
Flap Drive System, 777 Maintenance Manual, Publication Date: Circa 1994 (1 page).
Flap Transmission and Support, 777 Maintenance Manual, Publication Date: Circa 1994 (1 page).
International Search Report, PCT/US03/19724/ Sep. 11, 2003, 5 pages.
Moog, Component Maintenance Manual, May 1994 (2 pages).
Niu, Chen-Yen, Airframe Structural Design, Chen-Yeun Niu, Conmilit Press, 1988 (1 page).

* cited by examiner

LEADING EDGE FLAP APPARATUSES AND ASSOCIATED METHODS

TECHNICAL FIELD

Embodiments of the present invention relate to leading edge flap apparatuses and corresponding methods.

BACKGROUND

Modern aircraft often use a variety of high lift leading edge and trailing edge devices to improve high angle of attack performance during various phases of flight, for example, takeoff and landing. One such device is a leading edge Krueger assembly 10, shown schematically in an extended position in FIG. 1. When the Krueger assembly 10 is in the extended position, it can improve the airflow characteristics over a wing 40 at high angles of attack, allowing the wing 40 to operate at higher angles of attack without stalling.

The Krueger assembly 10 includes a first surface 11, a second surface 12, six links that connect the Krueger assembly 10 to the wing 40, and an actuator 30. The actuator 30 includes a torque tube 31 with a lever 32. The lever 32 is pivotally connected to a first link 14 at point Q. The first link 14 is also pivotally connected to a second link 16 at point S. The second link 16 is pivotally connected to the wing 40 at point R and pivotally connected to a third link 18 at point T. The third link 18 is pivotally connected to the first surface 11 at point U.

The first surface 11 is pivotally connected to the wing 40 at point O. As the actuator 30 rotates the torque tube 31, the lever 32 moves the first link 14, which in turn moves the second link 16 and the third link 18. The third link 18 causes the first surface 11 to pivot about point O.

The second surface 12 is pivotally connected to the first surface 11 at point P. Three additional links coordinate the movement of the second surface 12 relative to the first surface 11. In particular, a fourth link 20 is pivotally connected to the wing 40 at point V and pivotally connected to a fifth link 22 at point W. The fifth link 22 is pivotally connected to the first surface 11 at point X and pivotally connected to a sixth link 24 at point Y. The sixth link 24 is pivotally connected to the second surface 12 at point Z. As the actuator 30 moves the first surface 11, the second surface 12 is moved in a coordinated manner relative to the first surface 11 by the fourth link 20, the fifth link 22, and the sixth link 24.

The Krueger assembly 10 can be retracted to form a lower portion of the wing 40. In FIG. 1, the first and second surfaces 11, 12 are shown in the retracted position by dotted lines. The retracted position is suitable for cruise and other low angle of attack operations. In order to move the Krueger assembly 10 from the retracted to the extended position, the actuator 30 rotates the torque tube 31 in the direction of the arrow $R_1$.

During extension, the second surface 12 rotates relative to the first surface 11 about point P as both surfaces move to the extended position. As the two surfaces transition through an intermediate position where the first surface 11 is approximately perpendicular to a chord line 42 of the wing 40, the second surface 12 rotates relative to the first surface 11 so that it extends below the first surface 11, as shown by dashed lines in FIG. 1. This arrangement presents a large surface area to the relative wind (arrow W) during extension. Accordingly, the drag created by the first and second surfaces 11, 12 as the Krueger assembly 10 transitions through this intermediate position can be greater than the drag of the first and second surfaces 11, 12 in the extended or retracted positions.

Although the Krueger assembly 10 only has one extended position, the actuator 30 can also be connected to other devices (not shown) that have multiple extended positions. Accordingly, once the Krueger assembly 10 is moved from the retracted position to the extended position, the actuator 30 can rotate an additional amount in the direction of arrow $R_1$ to move the other devices to additional extended positions. As the actuator 30 rotates by this additional amount, the torque tube 31 moves the lever 32, which moves the first link 14 as shown by ghosted lines, but leaves the first and second surfaces 11, 12 in generally the same extended position. A drawback with the system discussed above and shown in FIG. 1 is that it is complex (using six links with ten pivot points) and therefore costly to manufacture and maintain.

SUMMARY

The present invention is directed generally toward leading edge flap apparatuses and corresponding methods. One aspect of the invention is directed toward an aircraft system that includes an airfoil with a leading edge, a lower surface, and a chord line. The system can further include a leading edge device having a first flow surface and a second flow surface. The first flow surface can be coupled to the airfoil and the second flow surface can be coupled to the first flow surface. The leading edge device can be movable along a motion path among a retracted position, an extended position, and an intermediate position. In the intermediate position, the first flow surface can be at least approximately perpendicular to the chord line of the airfoil. The motion path can include a first segment between the retracted position and the intermediate position along which the second flow surface is positioned generally behind and/or generally above the first flow surface. The motion path can also include a second segment between the intermediate position and the extended position.

Another aspect of the invention is directed toward an aircraft system that includes an airfoil and an actuator driver coupled to the airfoil. The system can further include a leading edge device with a first flow surface coupled to the airfoil and a second flow surface coupled to the first flow surface. The leading edge device can include six links. A first link can be pivotally coupled to the actuator driver and a second link can be pivotally coupled to the airfoil and to the first link. A third link can be pivotally coupled to the second link and to the first flow surface. A fourth link can be pivotally coupled to the airfoil and a fifth link can be pivotally coupled to the fourth link and to the first flow surface. Additionally, the second link can be coupled to both the first link and the third link at a first common point, and/or both the third link and the fifth link can be pivotally coupled to the first flow surface at a second common point. A sixth link can be coupled to the fifth link and the second flow surface.

In a further aspect of the invention, the actuator driver can be movable among at least three stationary positions, e.g., a first position, a second position, and a third position. The first flow surface can be in the same first surface location when the actuator driver is in both its first and second position. The second flow surface can also be in the same second surface location (different than the first flow surface location) when the actuator driver is in both the first and second positions.

DETAILED DESCRIPTION

The present disclosure describes leading edge flap apparatuses and associated methods. Several specific details of the invention are set forth in the following description and in FIGS. 2-7 to provide a thorough understanding of certain embodiments of the invention. One skilled in the art, however, will understand that the present invention may have additional embodiments, and that other embodiments of the invention may be practiced without several of the specific features described below.

Figure 2:
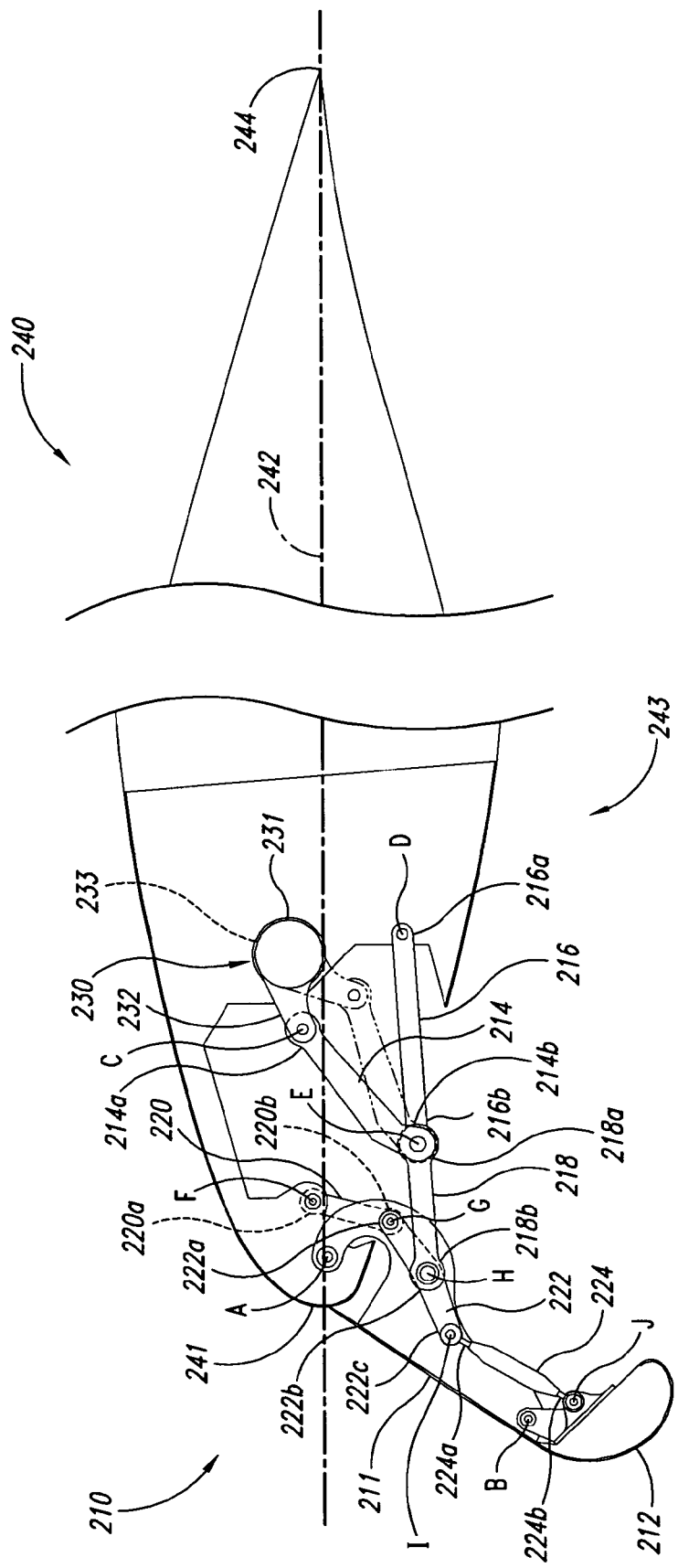
FIG. 2 is a partially schematic illustration of an airfoil and a leading edge device, shown in an extended position, in accordance with an embodiment of the invention.
Figure 3:
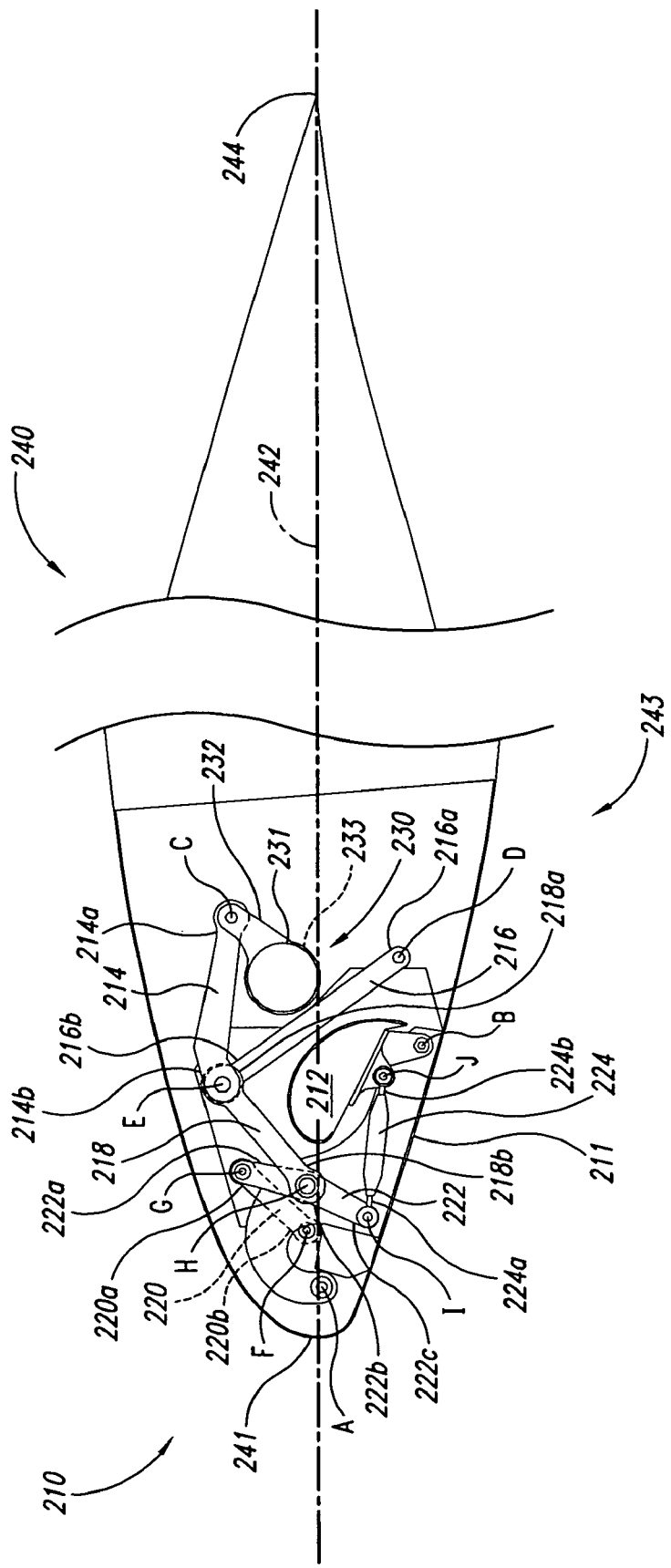
FIG. 3 is a partially schematic illustration of the airfoil and leading edge device shown in FIG. 2, with the leading edge device shown in a retracted position.

FIG. 2 is a partially schematic illustration of an airfoil 240 and a leading edge device 210 (e.g., a Krueger flap), shown in an extended position in accordance with an embodiment of the invention. FIG. 3 is a partially schematic illustration of the airfoil 240 and the leading edge device 210 shown in FIG. 2 with the leading edge device 210 in the retracted position. Referring to both FIGS. 2 and 3, the airfoil 240 includes a leading edge 241, a trailing edge 244, a lower surface 243, and a chord line 242 that extends through a mid-point of the leading edge 241 and a mid-point of the trailing edges 244.

An actuator driver 230 can be coupled to the airfoil 240 to move the leading edge device 210 between at least the retracted and extended positions. The actuator driver 230 can include one or more actuators 233, a torque tube 231, and a lever 232. The actuators 233 can be mechanically, hydraulically, pneumatically, and/or electrically operated. The actuator driver 230 can include other arrangements, for example, multiple levers 232 and links, and/or a direct connection between the actuators 233 and the leading edge device 210 without any levers 232 and/or torque tubes 231.

The leading edge device 210 includes a first flow surface 211 and a second flow surface 212. The first and second flow surfaces 211, 212 can include rigid and/or flexible portions (e.g., the first flow surface 211 can include a flexible panel and the second flow surface can include a solid portion and/or a flexible portion). As shown in FIG. 2, the first and second flow surfaces 211, 212 are positioned generally below the airfoil 240 to form an extension of the leading edge 241 when in the extended position. When in the retracted position (shown in FIG. 3) the first and second flow surfaces 211, 212 are positioned generally behind the leading edge 241 of the airfoil 240 to form a portion of the lower surface 243. In FIG. 3, the first flow surface 211 forms a lower portion of the airfoil 240 and the second flow surface 212 is positioned above and/or behind the first flow surface 211 and recessed into the airfoil 240. In other embodiments, other portions of the first flow surface 211 and/or the second flow surface 212 can form a part of the lower surface 243 of the airfoil 240. For example, in one embodiment a portion of the second flow surface 212 can also form a part of the lower surface 243 of the airfoil 240.

The first flow surface 211 can be coupled to the airfoil 240 at point A and the second flow surface 212 can be coupled to the first flow surface 211 at point B. Several links (e.g., six) can also couple the leading edge device 210 to the airfoil 240 and to the actuator driver 230. The arrangement of six links (shown as a first link 214, second link 216, third link 218, fourth link 220, fifth link 221 and sixth link 274) is described below with reference to FIGS. 2 and 3.

The first link 214 includes a first portion 214a (pivotally coupled to a lever 232 at point C) and a second portion 214b. A second link 216 includes a first portion 216a (pivotally coupled to the airfoil 240 at point D) and a second portion 216b. The leading edge device 210 can include a third link 218 having a first portion 218a and a second portion 218b. The second portion 214b of the first link 214 can be pivotally coupled to the second portion 216b of the second link 216 and the first portion 218a of the third link 218 at a first common point E.

The leading edge device 210 can include a fourth link 220 having a first portion 220a pivotally coupled to the airfoil 240 at point F and a second portion 220b. The leading edge device 210 can include a fifth link 222 having a first portion 222a, a second portion 222b, and a third portion 222c. The first portion 222a of the fifth link 222 can be pivotally coupled to the second portion 220b of the fourth link 220 at point G. Both the second portion 222b of the fifth link 222 and the second portion 218b of the third link 218 can be coupled to the first flow surface 211 at a second common point H.

The leading edge device 210 includes a sixth link 224 having a first portion 224a pivotally coupled to the third portion 222c of the fifth link 222 at point I and a second portion 224b. The second portion 224b of the sixth link 224 can be pivotally coupled to the second flow surface 212 at point J.

As illustrated in FIG. 2, the actuator driver 230 can move the first flow surface 211 by moving the first link 214, which in turn moves the second link 216, the third link 218, and the first flow surface 211. The actuator driver 230 also moves the second flow surface 212 through the various links described above. Movement of the second flow surface 212 relative to the first flow surface 211 is controlled primarily by the fourth link 220, the fifth link 222, and the sixth link 224.

The actuator driver 230, which drives the leading edge device 210, can also be coupled to other flight control devices (e.g., other leading edge devices and/or trailing edge devices) that have multiple extended positions. For example, the actuator driver 230 also can drive a set of leading edge slats that have an extended takeoff position and an extended landing position. Because in certain embodiments the leading edge device 210, shown in FIGS. 2 and 3, has a single extended position that is used for both takeoff and landing, there is a need to retain the first and second flow surfaces 211, 212 of the leading edge device 210 in at least approximately the single extended position, while the actuator driver 230 continues to move (rotate) to position the leading edge slats to another extended position (e.g., from the extended takeoff position to the extended landing position). Such a feature is illustrated in FIG. 2.

In FIG. 2, the first and second flow surfaces 211, 212 of the leading edge device 210 are shown in the extended position and the actuator driver 230 is shown in a first position by solid lines and in a second position by phantom lines. As the actuator driver 230 moves from the first position to the second position, the torque tube 231 rotates and moves the lever 232, which in turn moves the first link 214. Although the first link 214 moves when the actuator driver 230 moves from the first position to the second position, the first and second flow surfaces 211, 212 remain located in, and/or return to, at least approximately the same position.

In other embodiments one or both of the common points E and H described above can be replaced by multiple pivot points. For example, in one embodiment, the second portion 214b of the first link 214 can be pivotably coupled to the second portion 216b of the second link 216 at a different point than the point where the first portion 218a of the third link 218 is coupled to the second portion 216b of the second link 216. In another embodiment, the second portion 218b of the third link 218 can be coupled to the first flow surface 211 at a different point than the point where the second portion 222b of the fifth link 222 is coupled to the first flow surface 211. In yet another embodiment, the second portion 218b of the third link 218 can be coupled to the fifth link 222 at a different point than the point where the fifth link 222 is coupled to the first flow surface 211.

Figure 1:
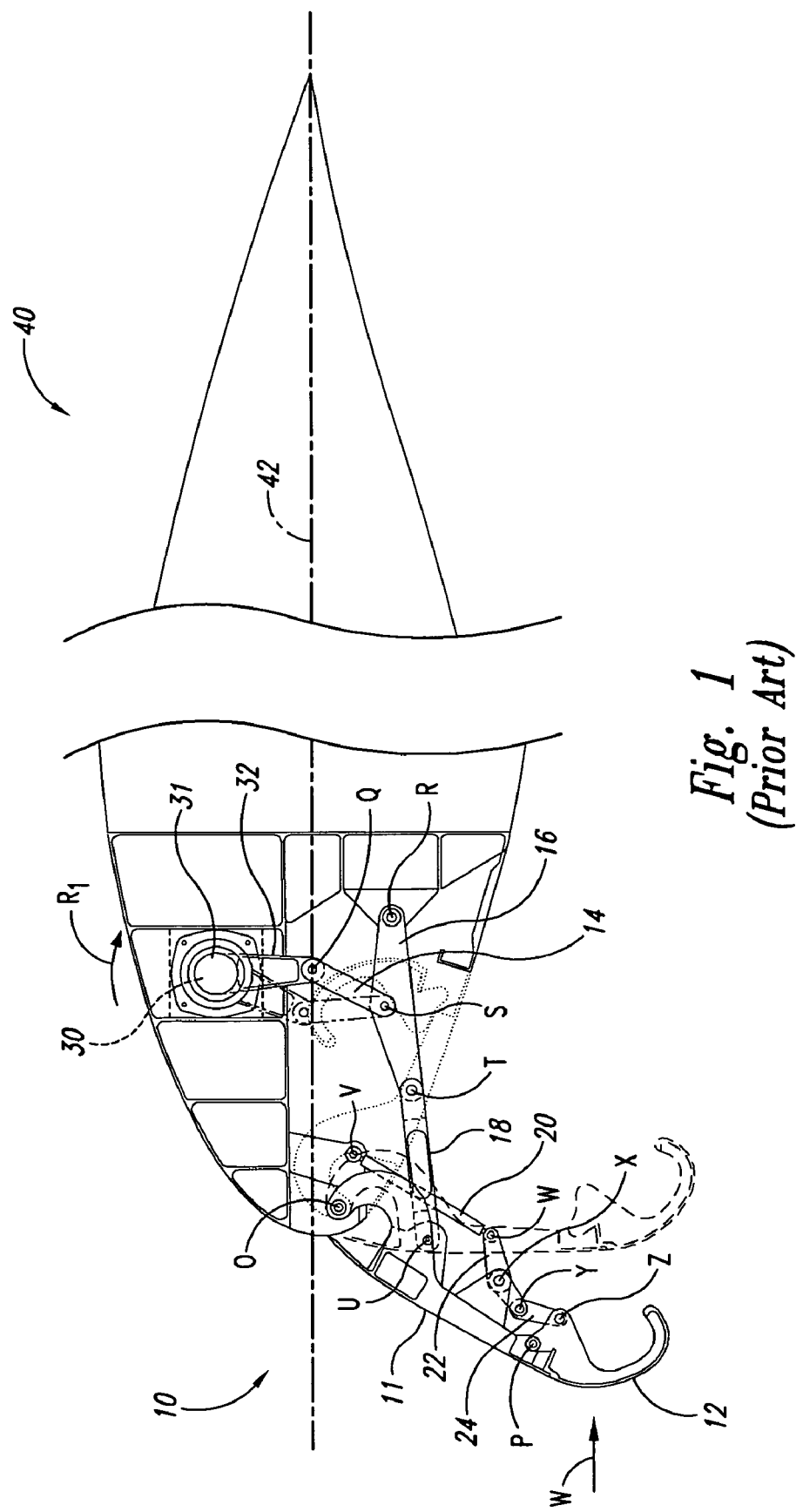
FIG. 1 is a partially schematic illustration of an airfoil with a Krueger assembly in accordance with the prior art.

A feature of embodiments described above with reference to FIGS. 2 and 3 is that fewer pivot points are needed to position the first and second flow surfaces between the retracted and extended positions than are required by current systems. In particular, the links in the system described above with reference to FIG. 1 require ten pivot points, while the system described above with reference to FIGS. 2 and 3 requires only eight or nine pivot points. An advantage of this feature is that reducing the number of pivot points can reduce the cost of manufacturing and/or maintaining the leading edge device. Another advantage of this features is that having fewer pivot points can reduce the weight of the leading edge device, which can reduce the operating cost of the aircraft.

Figure 4:
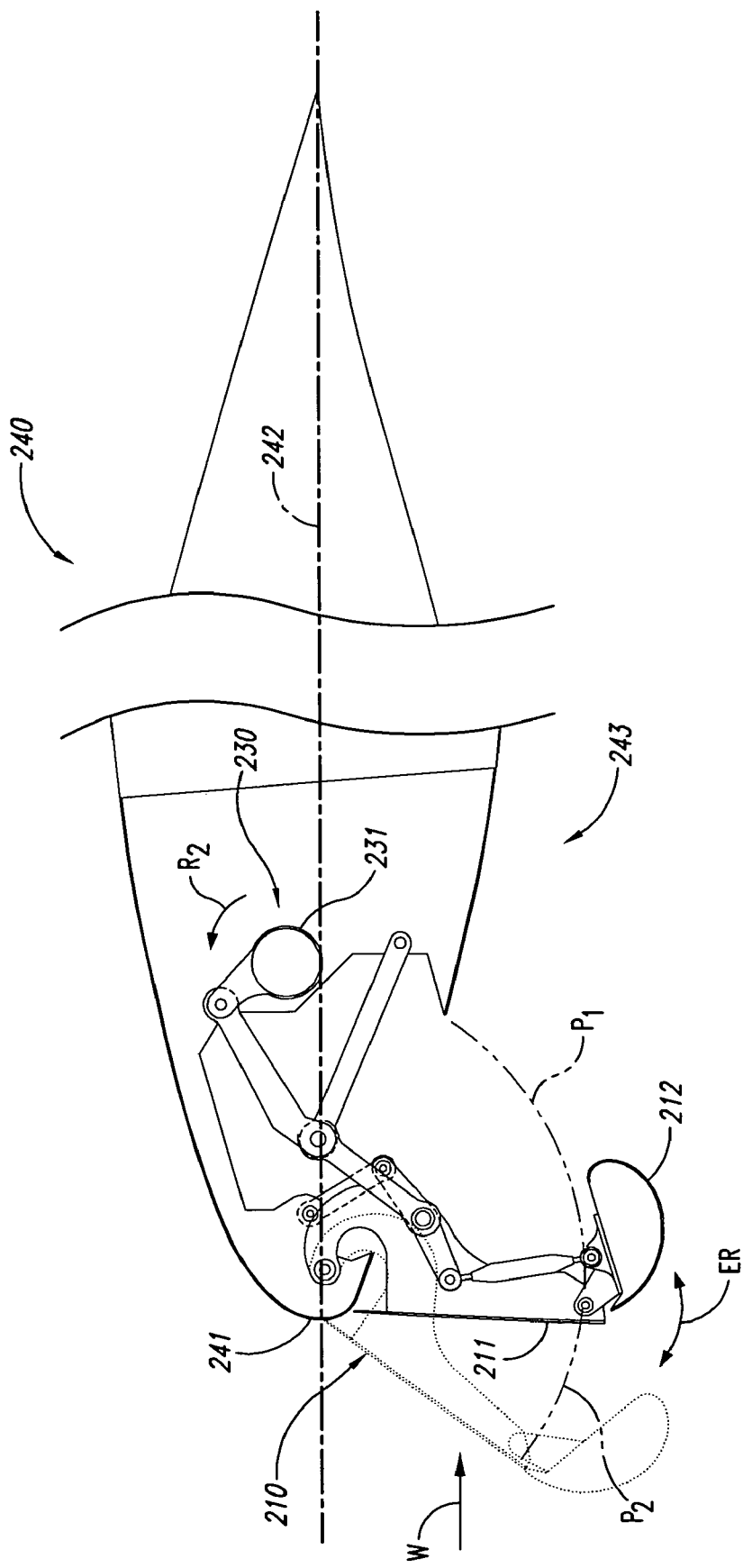
FIG. 4 is a partially schematic illustration of an airfoil and a leading edge device in accordance with another embodiment of the invention.

FIG. 4 is a partially schematic illustration of an airfoil 240 and a leading edge device 210, similar to the leading edge device discussed above with reference to FIGS. 2 and 3, but configured to provide an additional mechanical advantage and/or reduce drag during deployment or extension, in accordance with another embodiment of the invention.

In the illustrated embodiments, the actuator driver 230 rotates in the direction of arrow $R_2$, to move the first and second flow surfaces 211, 212 from a retracted position to an extended position. As the actuator driver 230 rotates the torque tube 231 in the direction of arrow $R_2$, the top portion of the torque tube 231 (e.g., the portion of the torque tube 231 facing away from the lower surface 243 of the airfoil 240) moves towards the leading edge 241 of the airfoil 240. Correspondingly, the bottom portion of the torque tube 231 (e.g., the portion of the torque tube 231 facing toward the lower surface 243 of the airfoil 240) moves away from the leading edge 241 of the airfoil 240. Because the actuator driver 230 rotates the torque tube 231 in this manner, in some embodiments (depending on the specific components used in the leading edge device 210 (e.g., the size of the first and second flow surfaces 211, 212)), pivot points can be placed to provide an additional mechanical advantage to extend the first and second surfaces 211, 212 against the relative wind (depicted as arrow W) as compared to when the actuator driver 230 rotates the torque tube 231 in the opposite direction (as is done with current systems). This can reduce the force required to extend the leading edge device 210. In other embodiments, the leading edge device 210 can have different components and the pivot points can be located to provide a mechanical advantage when the actuator driver 230 rotates the torque tube 231 in a direction opposite arrow $R_2$.

Additionally, as shown in FIG. 4, the leading edge device 210 can be configured to reduce drag during deployment by "hiding" or at least partially hiding the second flow surface 212 from the relative wind (arrow W) during retraction and/or extension of the leading edge. As the leading edge device 210 moves between retracted and extended positions, the first and second flow surfaces 211, 212 move along a motion path, shown as arrow ER in FIG. 4. In the illustrated embodiment, the motion path ER includes the motion of an end of the first flow surface 211. In other embodiments, the motion path ER can be defined by the motion of other portions of the leading edge device 210. In any of these embodiments, the second flow surface 212 can be located behind and/or above the first flow surface 211 as the first flow surface 211 transitions through the high drag "barn door" position (e.g., where the first flow surface is at least approximately perpendicular to the chord line 242 of the airfoil 240). Accordingly, the second flow surface 212 can be positioned to contribute less drag than a conventional second flow surface (which typically compounds the drag created by the first flow surface by being unhidden during at least a portion of motion of the first flow surface, during extension and retraction.

The motion path ER can include a first segment $P_1$ and a second segment $P_2$. The first segment $P_1$ can extend between the retracted position and an intermediate position where the first flow surface 211 is at least approximately perpendicular to the chord line 242 of the airfoil 240 (shown in solid lines). The second segment $P_2$ can extend between the intermediate position and the extended position (shown in dotted lines). The leading edge device 210 can be configured so that the second flow surface 212 remains generally above and/or behind the first flow surface 211 (and generally out of the relative wind) when the first and second flow surfaces 211, 212 are in the first segment $P_1$ of the motion path ER, reducing the force on the first and second flow surfaces 211, 212, and therefore reducing the drag created by the first and second flow surfaces 211, 212. The leading edge device 210 can also be configured to position the second flow surface 212 below the first flow surface 211 to form an extension of the first flow surface as the leading edge device 210 moves through at least a portion of the second segment of the motion path (e.g., when the leading edge device 210 reaches the extended position). This feature allows the first and second flow surfaces 211, 212 to move between the retracted and extended positions, while reducing the force on the flow surfaces transiting the barn door position when compared to current systems.

In certain embodiments, the first and second flow surfaces 211, 212 can be discontinuous while in the first segment $P_1$ of the motion path ER (as shown in FIG. 4). In other embodiments, the first and second flow surface 211, 212 can be discontinuous while in the first and second segments $P_1$, $P_2$. In still other embodiments, the first and second flow surfaces 211, 212 can include a flexible material and be continuous throughout the first and second segments $P_1$, $P_2$ of the motion path ER.

Although in the illustrated embodiment, the linkage of the leading edge device 210 is configured to both (1) gain a mechanical advantage through the placement of the pivot points and (2) reduce the force on the first and second flow surfaces 211, 212 during deployment, it should be understood that the leading edge device 210 can be configured to have either of these features independently in other embodiments. For example, in another embodiment, a separate (second) actuator can be coupled between the first and second flow surfaces 211, 212 to extend the second flow surface 212 from generally above and/or behind the first flow surface 211 only after the first flow surface 211 has been placed in its extended position. Correspondingly, during retraction, the second actuator can retract the second flow surface 212 behind the first flow surface 211, before the first flow surface 211 is moved towards the retracted position.

A feature of at least some embodiments described above is that the amount of force that the actuator driver must exert to extend the first and second flow surfaces is reduced over current systems. An advantage of this feature is that smaller actuators can be used to extend and retract the leading edge device. This can result in a reduction in manufacturing costs, a reduction in weight, and a reduction in operating costs. Another advantage of this feature is that the wear and tear on the actuator driver and the leading edge device can be reduced. This can also result in a reduction in operating expenses. Still another advantage of this feature is that the leading edge device can use a larger second flow surface that can be better tailored to provide certain performance characteristics (when compared with existing systems) without a corresponding increase in the force that the actuator driver must exert during extension.

Another feature of at least some embodiments is that the leading edge device can create less drag during retraction. This in turn creates less overall aircraft drag during retraction. An advantage of this feature is that takeoff and initial climbout performance can be increased, thereby increasing maximum takeoff gross weight.

Figure 5:
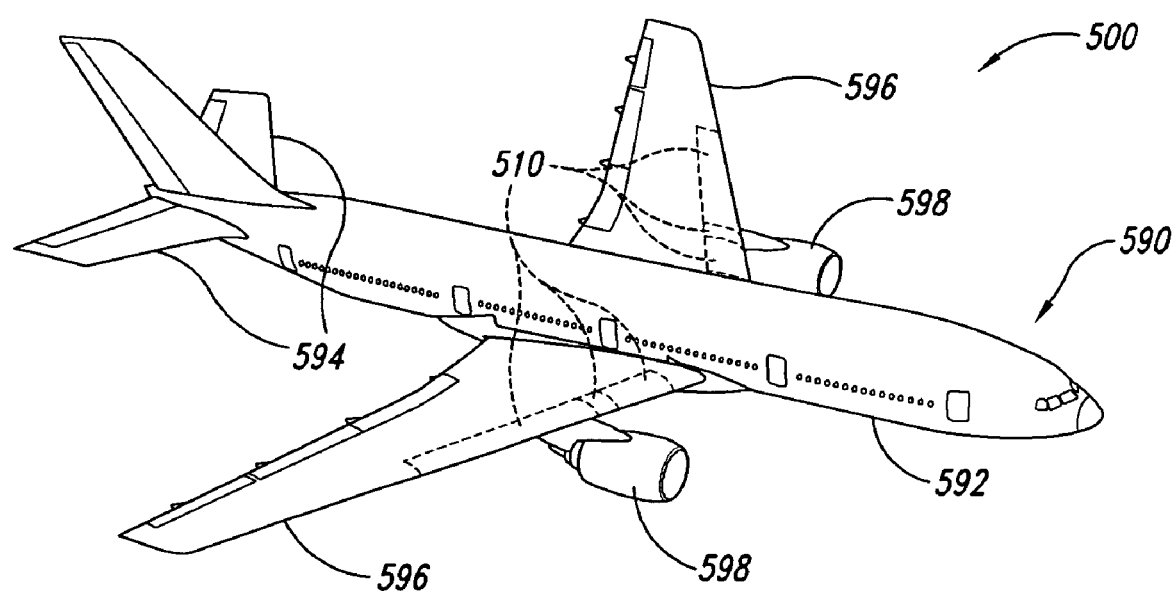
FIG. 5 is a partially schematic illustration of an aircraft with multiple airfoils and multiple leading edge devices in accordance with yet another embodiment of the invention.

Embodiments of the invention described above with reference to FIGS. 2-4 can be installed on many types of airfoils. For example, FIG. 5 illustrates an aircraft system 500, including an aircraft 590 with a fuselage 592, wings 596, and multiple leading edge devices 510 configured in accordance with embodiments of the present invention. In FIG. 5, the leading edge devices 510 are coupled to the wings 596 of the aircraft 590. In other embodiments, leading edge devices similar to those described above can be installed on other airfoils (e.g., on a horizontal tail 594). In FIG. 5, leading edge devices 510 are used on portions of the airfoil outboard and inboard of the aircraft engines 598. Smaller segments can be used proximate to the aircraft engines 598 to control airflow around the engines 598 and local airfoil section (two smaller segments are shown inboard of the engines in FIG. 5). These smaller leading edge devices 510 can be used to control the airflow proximate to the engines 598 and airfoil and can reduce drag and/or improve aircraft performance characteristics over an aircraft 590 without such devices. In other embodiments, portions of larger segments can be used in the same manner, for example, a single inboard segment can be used on each wing 596 and a portion of the single inboard segment can be used to control airflow proximate to the engines 598.

Figure 6:
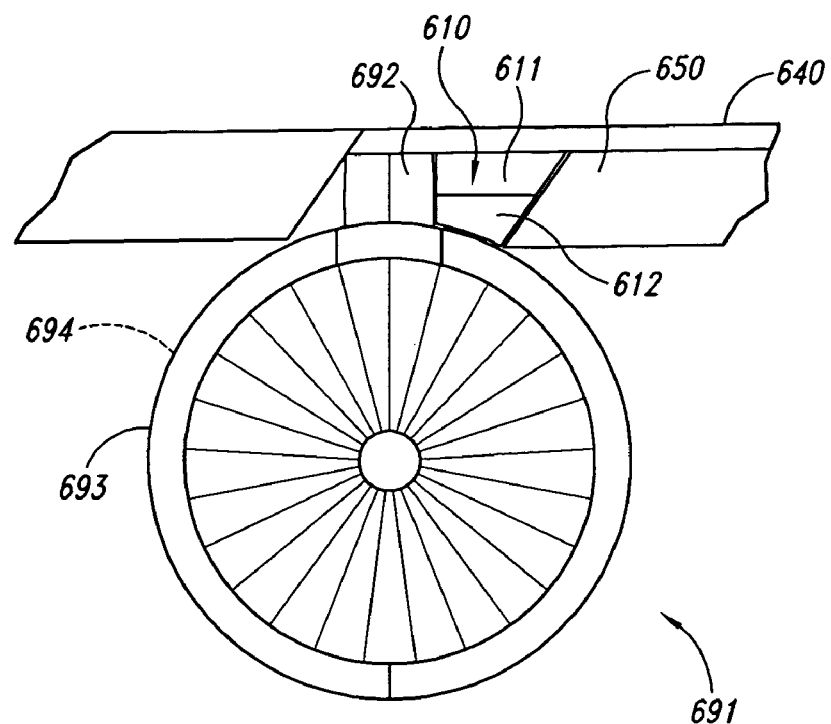
FIG. 6 is a partially schematic illustration of a leading edge device at least approximately aerodynamically sealed against a pylon, an engine nacelle, and another leading edge device, in accordance with still another embodiment of the invention.
Figure 7:
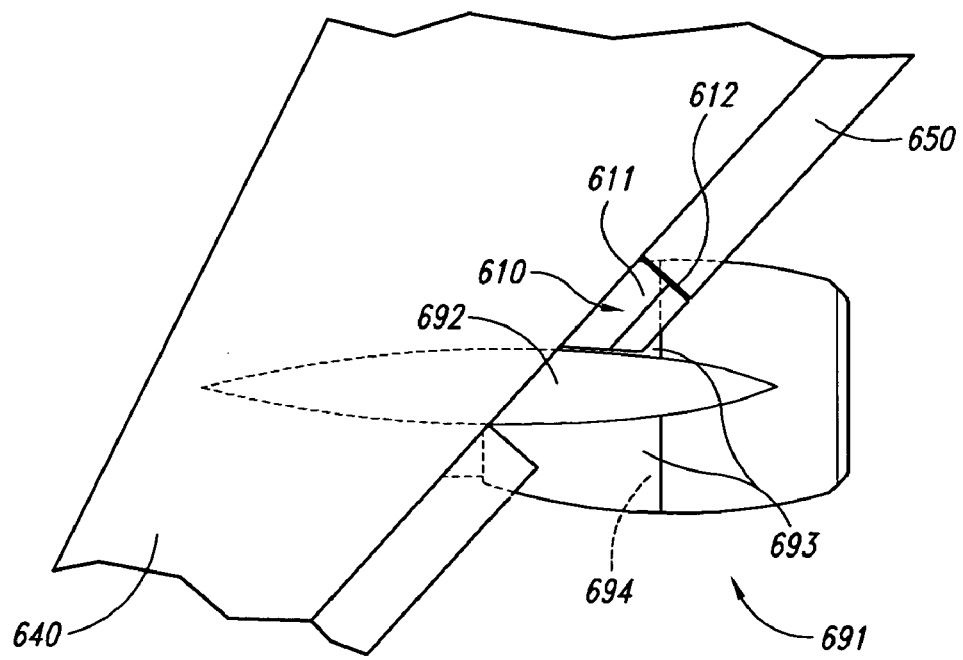
FIG. 7 is a partially schematic planform illustration of the leading edge device arrangement shown in FIG. 6.

FIGS. 6 and 7 show a first leading edge device 610 with a first flow surface 611 and second flow surface 612 coupled to an airfoil 640 proximate to an engine 691. In FIGS. 6 and 7, the first leading edge device 610 is shown in an extended position such that it is at least approximately aerodynamically sealed against an engine pylon 692, an engine nacelle 693, and a second leading edge device 650, which is laterally disposed from the first leading edge device 610 to prevent a substantial amount of air from flowing through the sealed area. In other embodiments, the first leading edge device 610 can be at least approximately aerodynamically sealed against one or more of the engine pylon 692, the engine nacelle 693, and/or the second leading edge device 650.

In certain embodiments, the leading edge device 610 can seal against an engine nacelle that is coupled to a thrust reverser 694 so that part of the engine nacelle moves with the deployment of the thrust reverser. A portion of the leading edge device (e.g., the second flow surface 612) can move with the nacelle to maintain an approximate aerodynamic seal and/or to retain a selected gap or distance between the nacelle 693 and the second flow surface 612 of the leading edge device 610 as part of the nacelle moves with the thrust reverser. In certain embodiments, the second flow surface 612 can include a flexible portion to further facilitate at least approximately aerodynamically sealing the second flow surface 612 against other surfaces.

A feature of embodiments described above is that the flow proximate to an airfoil (e.g., a wing) and an engine can be controlled to reduce aerodynamic drag or increase aircraft performance (e.g., lift and/or high angle of attack performance). An advantage of this feature is that overall aircraft performance (e.g., lift and/or drag) can be increased. This performance increase can improve landing and/or takeoff performance allowing an aircraft to carry more weight into or out of selected airports.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. An aircraft system, comprising:
   an airfoil;
   an actuator driver coupled to the airfoil; and
   a leading edge device having:
      a first flow surface coupled to the airfoil;
      a second flow surface coupled to the first flow surface;
      a first link being pivotally coupled to the actuator driver;
      a second link being pivotally coupled to the airfoil and to the first link;
      a third link being pivotally coupled to the second link and to the first flow surface;
      a fourth link being pivotally coupled to the airfoil;
      a fifth link being pivotally coupled to the fourth link and to the first flow surface, and wherein:
        (a) the second link is coupled to both the first link and the third link at a first common point; or
        (b) both the third link and the fifth link are pivotally coupled to the first flow surface at a second common point; or (c) both (a) and (b); and
a sixth link being coupled to the fifth link and the second flow surface.

2. The system of claim 1 wherein the actuator driver is movable among at least three stationary positions including a first position, a second position, and a third position and wherein the first and second flow surfaces of the leading edge device are located in at least approximately the same position when the actuator driver is in the first and second position.

3. The system of claim 1 wherein the actuator driver includes at least one of a mechanical actuator, a hydraulic actuator, an electric actuator, and a pneumatic actuator.

4. The system of claim 1 wherein the leading edge device includes a Krueger flap.

5. The system of claim 1 wherein the airfoil includes a lower surface and a leading edge, the actuator driver includes a torque tube having a top portion facing away from the lower surface of the airfoil, and the leading edge device is movable between at least two stationary positions, including:
a retracted position wherein the first and second flow surfaces are positioned generally behind the leading edge of the airfoil to form a portion of the lower surface of the airfoil; and
an extended position wherein the first and second flow surfaces are positioned to form an extension of the leading edge of the airfoil, and wherein the first link of the leading edge device is coupled to the actuator driver to move the leading edge device from the retracted position to the extended position when the torque tube rotates such that the top portion of the torque tube moves towards the leading edge of the airfoil.

6. The system of claim 1 wherein the airfoil includes a lower surface, a leading edge, and a chord line, and wherein the leading edge device is movable along a motion path among:
a retracted position;
an extended position; and
an intermediate position with the first flow surface at least approximately perpendicular to the chord line of the airfoil, and wherein the motion path has:
a first segment between the retracted position and the intermediate position along which the second flow surface is positioned at least one of generally behind and generally above the first flow surface; and
a second segment between the extended position and the intermediate position.

7. The system of claim 1, further comprising a fuselage coupled to the airfoil and an engine coupled to at least one of the airfoil and the fuselage.

8. The system of claim 1 wherein the airfoil includes a lower surface, and a leading edge, and wherein the system further comprises an engine pylon proximate to the airfoil, and further wherein the leading edge device is movable between at least two stationary positions, including:
a retracted position; and
an extended position wherein at least a portion of the leading edge device is at least approximately aerodynamically sealed against the engine pylon when the leading edge device is in the extended position.

9. The system of claim 1 wherein the airfoil includes a lower surface, and a leading edge, and wherein the system further comprises an engine having an engine nacelle proximate to the airfoil, and further wherein the leading edge device is movable between at least two stationary positions, including:
a retracted position; and
an extended position wherein at least a portion of the leading edge device is at least approximately aerodynamically sealed against the engine nacelle when the leading edge device is in the extended position.

10. The system of claim 1 wherein the airfoil includes a lower surface, and a leading edge, and wherein the system further comprises an engine proximate to the airfoil, the engine having an engine nacelle and a thrust reverser, a portion of the engine nacelle being coupled to the thrust reverser to move when the thrust reverser is deployed, and further wherein the leading edge device is movable between at least two stationary positions, including:
a retracted position; and
an extended position wherein at least a portion of the leading edge device moves with the portion of the engine nacelle when the leading edge device is in the extended position.

11. The system of claim 1 wherein the leading edge device includes a first leading edge device, the airfoil includes a lower surface, and a leading edge, and the system further comprises a second leading edge device laterally disposed from the first leading edge device, the second leading edge device having an extended position, and wherein the first leading edge device is movable between at least two stationary positions, including:
a retracted position; and
an extended position wherein at least a portion of the first leading edge device is at least approximately aerodynamically sealed against a portion of a lateral edge of the second leading edge device when the first leading edge device is in the extended position and the second leading edge device is in the extended position.

12. A method for making an aircraft system, comprising:
coupling a first flow surface and a second flow surface;
providing first, second, third, fourth, fifth and sixth links;
pivotally coupling the first link to the second link;
pivotally coupling the fourth link to the fifth link;
pivotally coupling the fifth link to the first flow surface, and:
(a) pivotally coupling the second link to both the first link and the third link at a first common point; or
(b) pivotally coupling both the third link and the fifth link to the first flow surface at a second common point; or
(c) both (a) and (b);
pivotally coupling the sixth link to the fifth link; and
pivotally coupling the sixth link to the second flow surface.

13. The method of claim 12, further comprising:
providing an aircraft with an airfoil;
coupling the second link to the airfoil;
coupling the fourth link to the airfoil; and
coupling the first link to an actuator driver.

14. The method of claim 12, further comprising:
providing an aircraft with an airfoil, the airfoil having a lower surface and a leading edge;
coupling the second link to the airfoil;
coupling the fourth link to the airfoil; and
coupling the first link to an actuator driver, wherein the actuator driver includes a torque tube having a top portion facing away from the lower surface of the airfoil, and wherein:
the leading edge device is movable between at least two stationary positions, including:
a retracted position; and
an extended position; and the leading edge device moves from the retracted position to the extended position when, as the torque tube rotates, a top portion of the torque tube moves toward the leading edge of the airfoil.

15. The method of claim 12, further comprising:
providing an aircraft with an airfoil, the airfoil having a lower surface and a leading edge;
coupling the second link to the airfoil; and
coupling the fourth link to the airfoil wherein the leading edge device is movable along a motion path among:
a retracted position;
an extended position; and
an intermediate position with the first flow surface at least approximately perpendicular to the chord line of the airfoil, and wherein the motion path has:
a first segment between the retracted position and the intermediate position along which the second flow surface is positioned at least one of generally behind and generally above the first flow surface; and
a second segment between the extended position and the intermediate position.

16. The method of claim 12, further comprising:
providing an aircraft with an airfoil;
coupling the second link to the airfoil;
coupling the fourth link to the airfoil; and
coupling the first link to an actuator driver, wherein the actuator driver is movable among at least three stationary positions including a first position, a second position, and a third position and wherein the first and second flow surfaces of the leading edge device are located in at least approximately the same position when the actuator driver is in the first and second position.

17. The method of claim 12, further comprising:
providing an aircraft with an airfoil and an engine pylon proximate to the airfoil, the airfoil having a lower surface and a leading edge;
coupling the second link to the airfoil; and
coupling the fourth link to the airfoil, wherein the leading edge device is movable between at least two stationary positions, including:
a retracted position; and
an extended position wherein at least a portion of the leading edge device is at least approximately aerodynamically sealed against the engine pylon when the leading edge device is in the extended position.

18. The method of claim 12, further comprising:
providing an aircraft with an airfoil and an engine proximate to the airfoil, the airfoil having a lower surface and a leading edge, the engine having an engine nacelle;
coupling the second link to the airfoil; and
coupling the fourth link to the airfoil, wherein the leading edge device is movable between at least two stationary positions, including:
a retracted position; and
an extended position wherein at least a portion of the leading edge device is at least approximately aerodynamically sealed against the engine nacelle when the leading edge device is in the extended position.

19. The method of claim 12, further comprising:
providing an aircraft with an airfoil and an engine proximate to the airfoil, the engine having an engine nacelle and a thrust reverser, a portion of the engine nacelle being coupled to the thrust reverser to move when the thrust reverser is deployed, the airfoil having a lower surface and a leading edge;
coupling the second link to the airfoil; and
coupling the fourth link to the airfoil, wherein the leading edge device is movable between at least two stationary positions, including:
a retracted position; and
an extended position wherein at least a portion of the leading edge device moves with the portion of the engine nacelle that moves with a thrust reverser when the leading edge device is in the extended position.

20. The method of claim 12 wherein the leading edge device includes a first leading edge device, and wherein the method further comprises:
providing an aircraft with an airfoil, the airfoil having a lower surface, a leading edge, and a second leading edge device laterally disposed from the first leading edge device, the second leading edge device having an extended position;
coupling the second link to the airfoil; and
coupling the fourth link to the airfoil, wherein the leading edge device is movable between at least two stationary positions, including:
a retracted position; and
an extended position wherein at least a portion of the first leading edge device is at least approximately aerodynamically sealed against a portion of a lateral edge of a second leading edge device when the first leading edge device is in the extended position and the second leading edge device is in the extended position.

21. An aircraft system, comprising:
an airfoil;
an actuator driver coupled to the airfoil,
leading edge means for forming a retractable extension of the leading edge of the airfoil, the leading edge means having:
a first flow surface coupled to the airfoil;
a second flow surface coupled to the first flow surface;
a first link being pivotally coupled to the actuator driver;
a second link being pivotally coupled to the airfoil and to the first link;
a third link being pivotally coupled to the second link and to the first flow surface;
a fourth link being pivotally coupled to the airfoil;
a fifth link being pivotally coupled to the fourth link and to the first flow surface, and wherein:
(a) the second link is coupled to both the first link and the third link at a first common point; or
(b) both the third link and the fifth link are pivotally coupled to the first flow surface at a second common point; or
(c) both (a) and (b); and
a sixth link being coupled to the fifth link and the second flow surface.

22. The system of claim 21 wherein the actuator driver is movable among at least three stationary positions including a first position, a second position, and a third position and wherein the first and second flow surfaces of the leading edge means are located in at least approximately the same position when the actuator driver is in the first and second position.

23. The system of claim 21, further comprising a fuselage coupled to the airfoil and an engine coupled to at least one of the airfoil and the fuselage.

* * * * *